United States Patent [19]

Kaminski et al.

[11] Patent Number: 4,628,417
[45] Date of Patent: Dec. 9, 1986

[54] COMBINATION DOME/CARGO LAMP

[75] Inventors: Les K. Kaminski; Michael E. Dyke, both of Sterling Heights, Mich.

[73] Assignee: Chrysler Motors Corporation, Highland Park, Mich.

[21] Appl. No.: 806,912

[22] Filed: Dec. 9, 1985

[51] Int. Cl.[4] .............................................. B60Q 3/06
[52] U.S. Cl. ...................................... 362/74; 362/80; 362/322; 362/427; 362/294
[58] Field of Search .................. 362/61, 80, 427, 232, 362/296, 370, 74, 285, 287, 294, 373, 322, 324, 372

[56] References Cited

U.S. PATENT DOCUMENTS

| | | | |
|---|---|---|---|
| 1,674,340 | 6/1928 | Nock | 362/80 |
| 2,772,406 | 11/1956 | Juergens | 362/80 |
| 2,783,365 | 2/1957 | Wilfert | 362/80 |
| 2,918,566 | 12/1959 | Lunsford | 362/74 |
| 2,999,150 | 9/1961 | Kallel | 362/80 |
| 3,020,392 | 2/1962 | Leslie | 362/80 |
| 3,982,119 | 9/1976 | Aluzzo et al. | 362/232 |
| 4,054,789 | 10/1977 | Romanelli | 362/80 |
| 4,511,954 | 4/1985 | Marcus et al. | 362/427 |

FOREIGN PATENT DOCUMENTS 3333048 4/1985 Fed. Rep. of Germany ........ 362/74

OTHER PUBLICATIONS

Three Sketches of Toyota Swing-Down Lamp for Pickup Truck

Primary Examiner—William A. Cuchlinski, Jr.
Assistant Examiner—D. M. Cox
Attorney, Agent, or Firm—Edward A. Craig

[57] ABSTRACT

A multi-purpose illumination device comprising, in one configuration, a dome lamp for the interior of a pickup truck cab and in another configuration a cargo light for illuminating the cargo box of a pickup truck, is provided. The lamp has an inner casing and an outer casing. The inner casing may be swung into the outer casing to configure the unit as a dome lamp. The inner casing may be swung away from the outer casing to configure the unit as a cargo lamp.

9 Claims, 7 Drawing Figures

COMBINATION DOME/CARGO LAMP

BACKGROUND OF THE INVENTION

1. Field of the Invention

This invention relates to illumination devices for motor vehicles and more particularly to a combination dome/cargo lamp for a pickup truck.

2. Prior Art

It is desired that a pickup truck be provided with a dome lamp for the interior of the cab to illuminate the cab. It is also desirable to provide a lamp for illuminating the cargo box of a pickup truck. Such a lamp is useful at night to permit loading and unloading or other activity in connection with the cargo box. Of course, separate lamps may be provided for these purposes, i.e., a dome lamp within the cab and a cargo lamp within the cargo box. However, for the convenience of the user of the pickup truck and to reduce cost, it would be desirable to combine the functions of cab illumination and cargo box illumination in a single lamp.

Swing-down lamps have recently been offered commercially and form a desirable feature readily adapted to the pickup truck configuration. In such constructions, a lamp fixture is secured to the headliner within the pickup cab adjacent to the rear window. The lamp fixture normally serves as a dome lamp and is operated conventionally by means of an on/off switch accessible to the cab occupant. The lamp employs a swing-down construction whereby it may be swung out of the ceiling and aimed through the rear window of the pickup truck into the cargo box to illuminate the cargo box.

In accordance with the present invention, such a swing-down construction is provided. The construction of the present invention includes guard means to prevent touching of the electrical wires associated with the lamp, it being appreciated that in a swing-down construction, it is necessary to have electrical wires which are not rigidly mounted so that they may swing with the lamp. The present invention provides guard structure to prevent touching of the electrical wiring by the hand of the person operating the lamp fixture. Such touching is undesirable inasmuch as the wiring may be damaged and it is broadly desired not to have electrical wiring be touchable for safety reasons.

The present construction also includes a unique feature for spring locking the swing-down portion of the lamp in the dome light configuration. This results in secure positionment of the lamp when it is used as a dome light while at the same time permitting easy manipulation of the lamp into a cargo box illuminating position.

SUMMARY OF THE INVENTION

A combination dome/cargo lamp for a pickup truck is provided. The pickup truck is of the type including a cargo box and cab having a rear window permitting viewing of the cargo box. The dome/cargo lamp comprises an outer casing having an upper portion securable to the ceiling of the cab adjacent to the rear window. The outer casing has a lower portion. An inner casing is provided. Pivot means connect the inner casing to the lower portion of the outer casing. An electric bulb is provided in the inner casing. A lens is provided on the inner casing covering the bulb to direct light outwardly of the inner casing. The inner casing is pivotable by hand into the outer casing where the lens will direct light into the cab thereby functioning as a dome lamp. The inner casing is also pivotable by hand downwardly away from the outer casing to a position where the lens will direct light through the rear window into a cargo box thereby functioning as a cargo lamp. The outer casing has an opening therethrough adjacent to the pivot means. An arcuate cover extends from the inner casing through the opening. Electrical wire means extend from the upper portion of the outer casing through the opening and between the inner casing and cover into operative connection with the bulb. The cover travels through the opening during pivoting of the inner casing and at all times isolates the electrical wire means from an operative hand. Wall means are preferably provided at each edge of the cover extending towards the inner casing to further isolate the electrical wire means from an operative hand.

The opening in the outer casing includes a marginal edge portion located closely adjacent to the cover. The cover includes a lip at the upper end thereof. The lip engages the marginal edge portion upon downward pivoting of the cover to limit the extent of downward pivoting of the inner casing and properly position the lens for directing light through the rear window. Frictional catch means are provided on the cover to engage the marginal edge portion of the opening when the lid contacts the marginal edge portion to thereby frictionally retain the inner casing in the downwardly pivoted position. Wire retaining structure is provided on the cover maintaining the wire means adjacent the cover. Opening means are preferably provided on the inner casing adjacent to the bulb to dissipate heat generated by the bulb when in use.

The inner casing is preferably secured to the outer casing by means of a tab. The outer casing has a recess to receive the tab when the inner casing is pivoted thereinto to thereby retain the inner casing in position. The pivot means includes a pin structure movably journaled in one of the outer and inner casing. Spring means urge the pin structure to a position wherein the tab is securely captured in the recess after it is received therein to securely retain the inner casing in place. The inner casing is movable against the action of the spring means to release the tab from the recess and permit pivoting of the inner casing downwardly away from the outer casing to a position where the lens will direct light through the rear window into the cargo box. Preferably, the spring means is located in the inner casing.

BRIEF DESCRIPTION OF A PREFERRED EMBODIMENT

Figure 1:
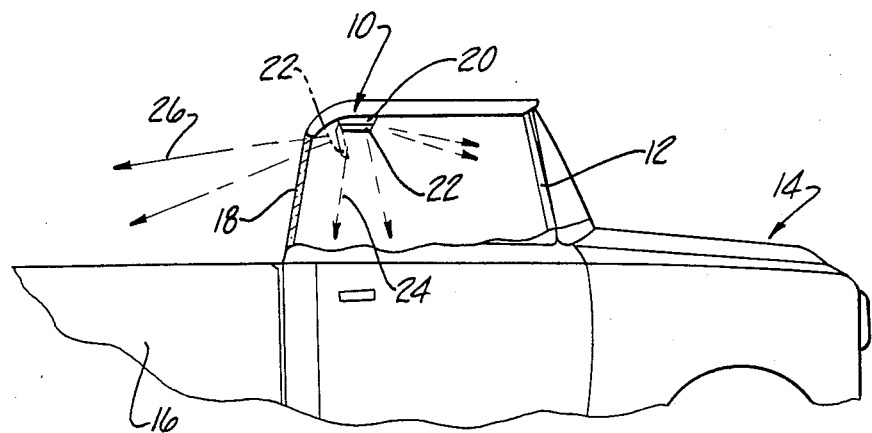
FIG. 1 is a side-elevational view of a portion of a pickup truck illustrating one embodiment of the dome/cargo lamp of the present invention mounted on the ceiling of the cab adjacent to the rear window.

Referring to FIG. 1, it will be noted that the dome/cargo lamp 10 is mounted within the cab 12 of a pickup truck 14. The lamp 10 is preferably fabricated of plastic material. The pickup truck 14 has the usual cargo box 16. A rear window 18 is provided between the cab 12 and cargo box 16. The window 18 permits viewing of the cargo box from the vantage point of the cab 12. Of course, the window 18 also serves the usual purpose of providing rear visibility for the driver of the pickup truck.

As will be noted, the lamp 10 is mounted adjacent to the rear window 18. The lamp 10 includes an outer casing 20 and an inner casing 22. The inner casing 22 is pivotably connected to the outer casing 20. When the inner casing 22 is pivoted into the outer casing 20 as shown in solid lines in FIG. 1, light 24 is directed to illuminate the interior of the cab 12. When the inner casing 22 is pivoted downwardly as shown in dotted lines, light 26 is directed through the rear window 18 into the cargo box 16 to illuminate the cargo box. Thus, either the cab interior or the cargo box may be illuminated as desired by simple manipulation of the inner casing 22.

Figure 4:
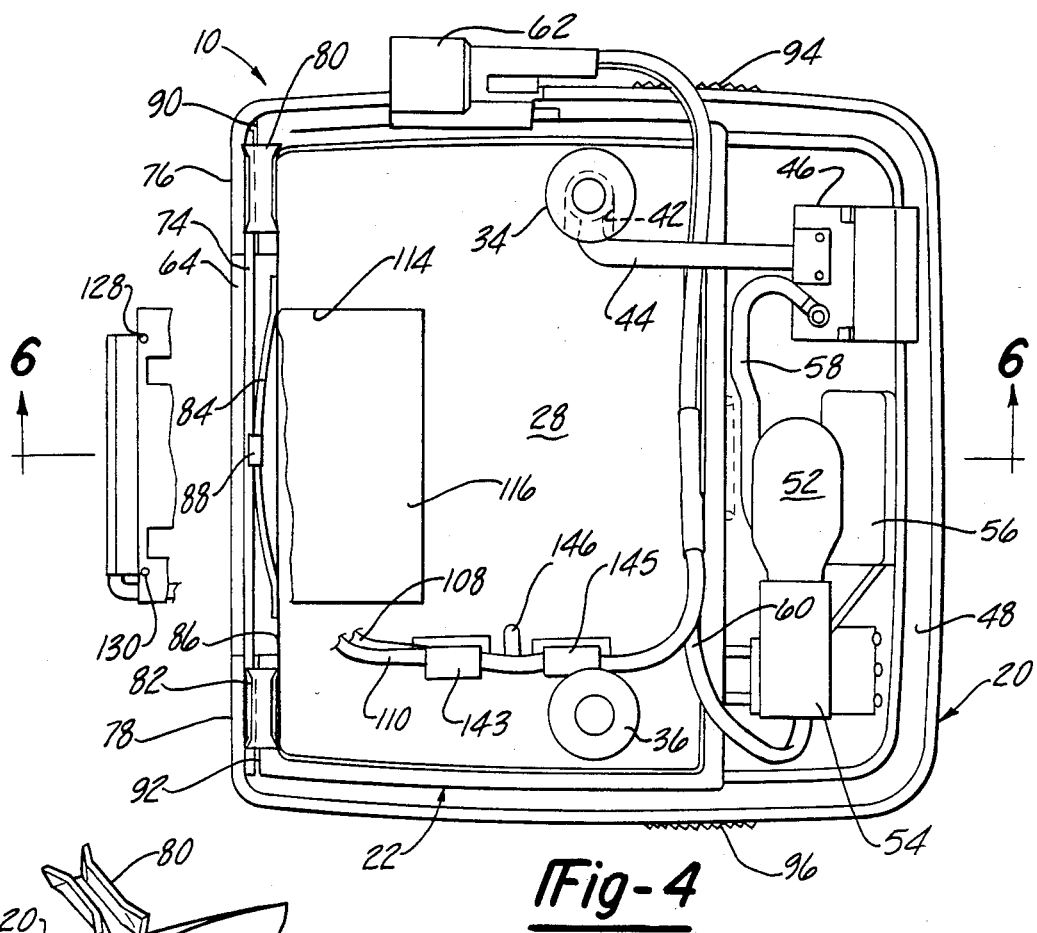
FIG. 4 is a top plan view of the dome/cargo lamp with portions broken away for the purpose of clarity.
Figure 6:
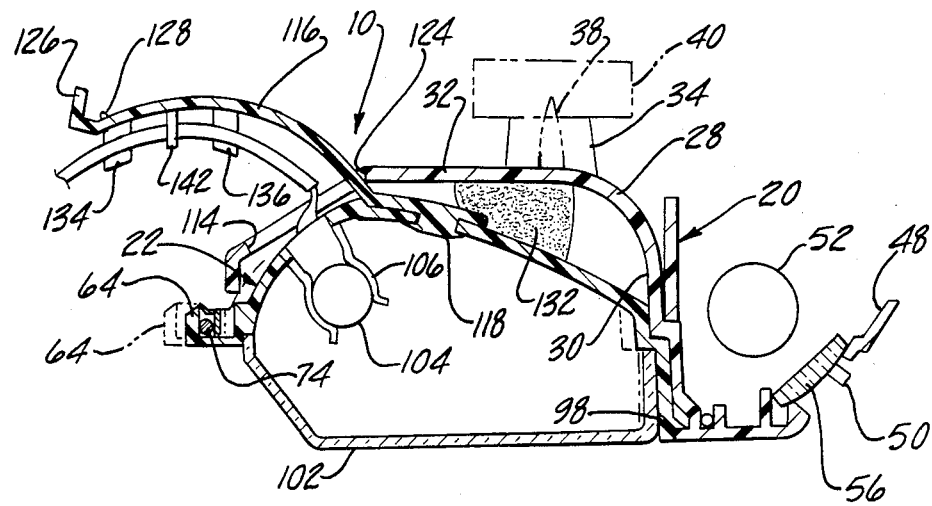
FIG. 6 is a sectional view taken substantially along the line 6—6 of FIG. 4 looking in the direction of the arrows.
Figure 7:
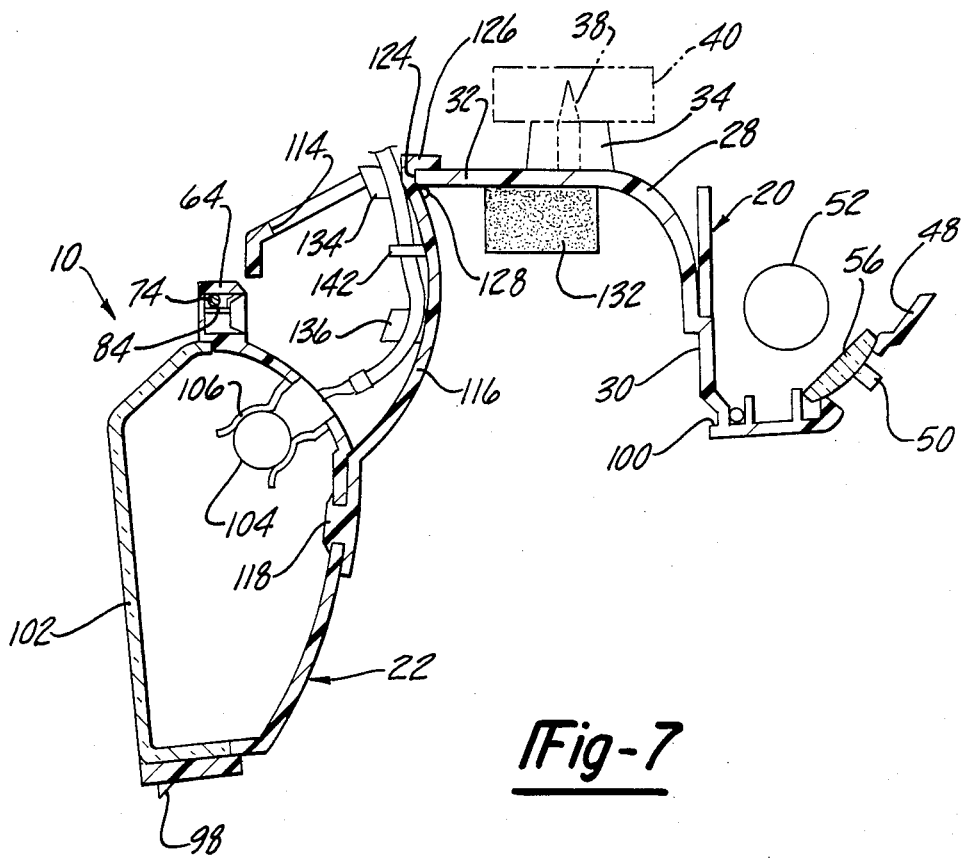
FIG. 7 is a sectional view similar to FIG. 6 with the dome/cargo lamp in a configuration to function as a cargo lamp.

Referring to the remaining figures, it will be noted that the outer casing has an upper portion 28 which is securable to the ceiling of the pickup truck cab 12. As best seen in FIGS. 6, 7 and 4, the outer casing 20 has a recess 30 to receive the inner casing 22. The recess 30 includes an upper wall 32 having a pair of bosses 34, 36 with central openings therethrough, through which screws 38 are passed into threading engagement with structure 40 of the cab ceiling.

One boss 34 has a slot 42 at the base thereof to receive the terminal of ground strap 44 which extends to a switch assembly 46. The ground strap 44 is grounded to the truck structure by means of the securing screw.

The outer casing 20 has a second recess 48 which faces upwardly and which houses a map light. The switch assembly 46 is mounted in the recess 48. Switch assembly 46 completes the ground circuit and has an on/off button 50 (FIG. 7) which permits turning of electrical power off and on to the lamp unit. A bulb 52 and socket 54 are mounted within the recess 48 adjacent to the switch assembly 46. The socket is grounded through the switch assembly by means of a lead 58. A second line lead 60 extends from the socket 54 to a plug receptacle 62 which is mounted on the outer casing 20. A lens 56 is provided in front of the bulb 52. When the switch assembly 46 is actuated to the on position, light from the bulb 52 is passed through the lens 56 into the cab of the pickup truck. This is a fairly narrow beam which serves as a map reading light.

Figure 5:
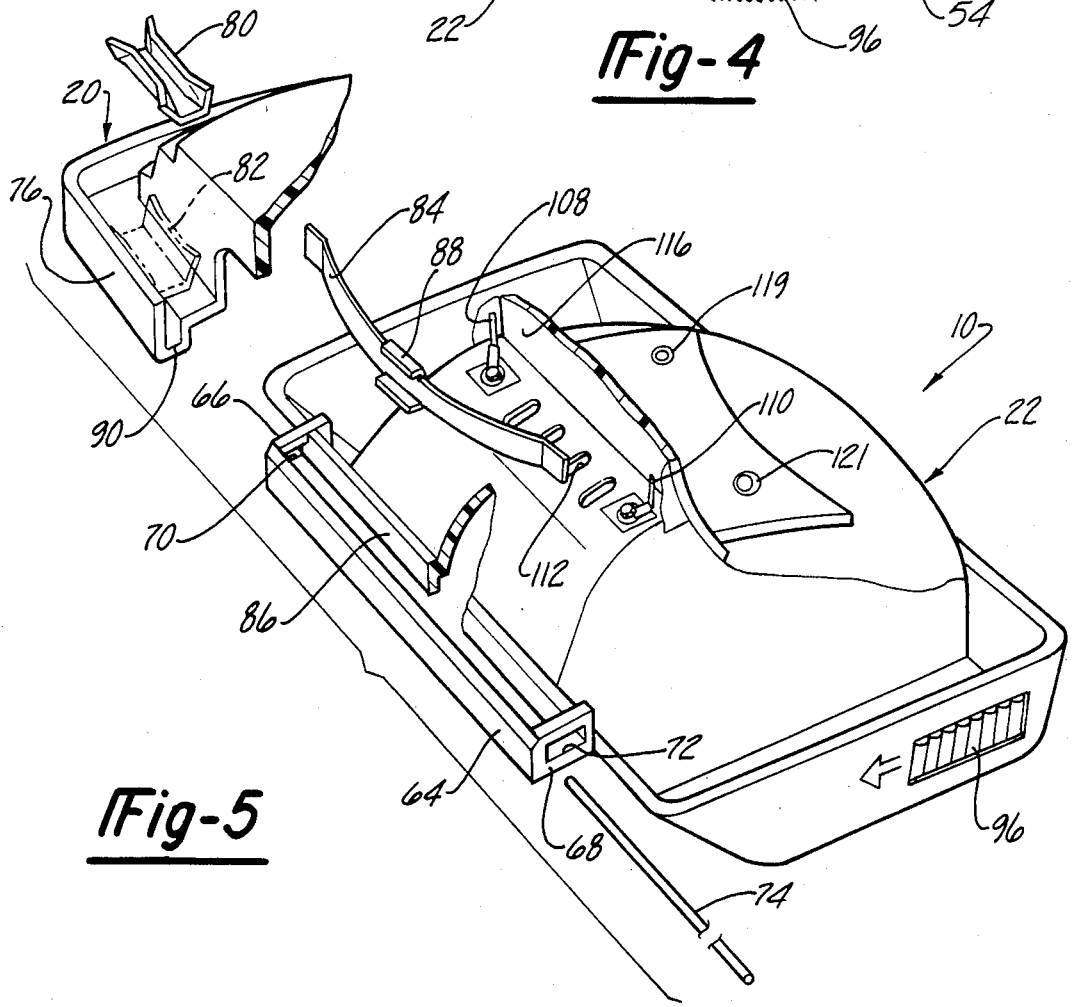
FIG. 5 is an exploded view in perspective of the dome/cargo lamp with portions broken away for the purpose of clarity.

Inner casing 22 is secured to the outer casing 20 by pivot means. This is best illustrated in FIGS. 4, 5 and 6. The inner casing 22 has a hollow projecting portion 64 along one edge thereof. The portion 64 terminates short of the ends of the inner casing. The projecting portion 64 has end walls 66, 68. Elongated slots 70, 72 are provided in the end walls. An elongated pin 74 extends through both slots 70, 72 and thus through the projecting portion 64.

The outer casing 20 has a center space defined by a pair of hollow projections 76, 78 provided at the outer edges thereof. As will be noted in FIGS. 4 and 5, the projections 76, 78 include recesses 90, 92 which receive the ends of the pin 74. The pin 74 is secured in recesses 90, 92 by means of snap-in clips 80, 82. A leaf spring 84 is received in the projecting portion 64 between the pin 74 and inner wall 86. The spring 84 bulges in the direction of the pin 74 thereby permitting movement of the pin 74 in the direction of wall 86 against the action of the spring 84. The spring 84 is tied to the pin 74 by means of an integral clip 88.

The pin is not free to move with respect to the outer casing 20 because its ends are held in recesses 90, 92. However, the pin is able to move relative to the inner casing 22 by virtue of the elongated slots 70, 72. Consequently, the inner casing 22 may be pushed by hand against the action of the spring 84 to result in the inner casing moving a distance illustrated in dotted lines in FIG. 6. Serrated portions 94, 96 with attendant arrows indicating the proper direction of push-to-open are provided on the sides of the inner casing 22 to facilitate this action.

Figure 3:
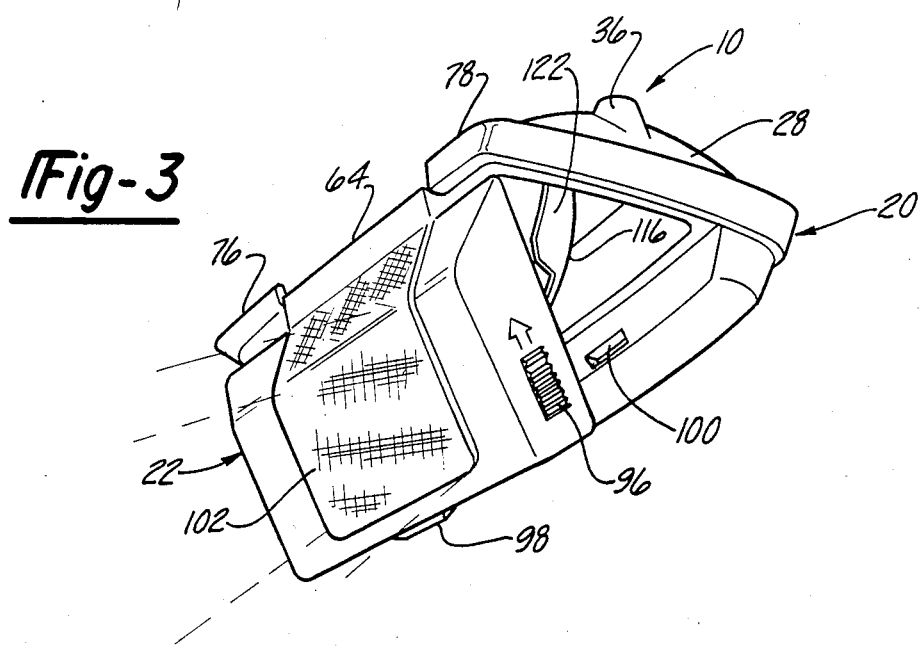
FIG. 3 is a perspective view of the dome/cargo lamp with the lamp in a configuration to serve as a cargo lamp.

As will be noted in FIGS. 3, 6 and 7, the inner casing 22 is provided with a tab 98 while the outer casing 20 is provided with a recess 100 for the reception of the tab when the inner casing 22 is pivoted therein to thereby retain the inner casing in position. The spring 84 urges the pin structure to a position wherein the tab 98 is securely captured in the recess 100 after it is received therein to securely retain the inner casing in place as shown in FIG. 6. As above described, the inner casing 22 is movable against the action of the spring 84 to release the tab 98 from the recess 100 and permit pivoting of the inner casing 22 downwardly away from the outer casing to a position where the lens 102 will direct light through the rear window 18 into the cargo box 16 as shown in FIGS. 1 and 3.

A bulb 104 is received in socket retainer 106 which is mounted within the inner casing 22. When energized, light from the bulb 104 is directed by the lens 102 either into the cab or into the cargo box as previously described. As will be noted in FIG. 5, leads 108, 110 extend from terminals provided on the inner casing and serve as a source of power for the bulb 104. A plurality of openings 112 are provided in the wall of the inner casing adjacent to the bulb 104. These openings permit dissipation of heat generated by the bulb when in use. The leads 108, 110 extend to receptacle 62. Receptacle 62 is connectable to a source of power in the vehicle, the ground lead being used to open and close the circuit by a remote switch as is conventional.

A relatively large opening 114 is provided through the outer casing 20 adjacent to the inner casing pivot means. An arcuate cover 116 is secured to the inner casing 22 by means of push nut structure 118 and locating pins 119, 121. The cover 116 may be additionally heat staked in place to provide a more secure attachment.

The cover 116 extends through the opening 114 in the inner casing 20. As will be noted, the electrical leads 108, 110 extend through the opening 114 along the surface of the wall 32 of the upper portion 28 of the outer casing 20. During movement of the cover 116, the electrical leads are always positioned between the inner casing 22 and the cover 116. During pivoting of the inner casing 22 with respect to the outer casing 20, the cover travels through the opening 114 and at all times isolates the electrical leads 108, 110 from the operative hand causing pivoting of the inner casing 22. By this means, the wire leads are prevented from being damaged and the operators hand is secured against the electrical connections.

Figure 2:
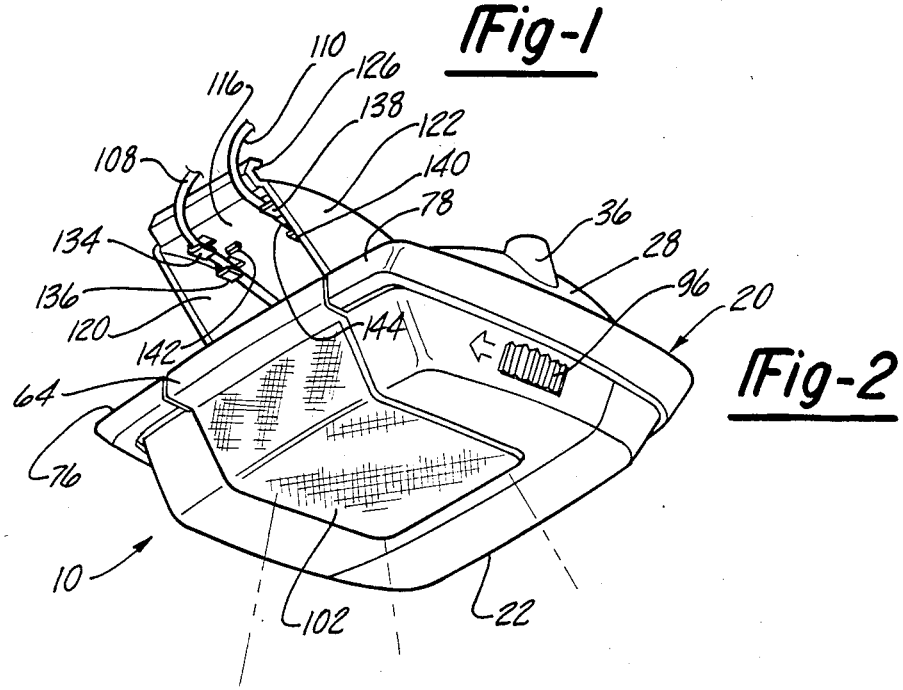
FIG. 2 is a perspective view of the dome/cargo lamp of the present invention with the lamp in a configuration to serve as a dome lamp.

As will be noted in FIGS. 2 and 3, side walls 120, 122 are provided at each edge of the cover 116 extending towards the inner casing 22 to further isolate the electrical leads 108, 110, from an operative hand. The arcuate nature of the cover 116 permits it to remain in contact with the edge 124 of the opening 114 whereby the cover 116 also serves as a guide to the pivoting action of the inner casing 22.

The cover 116 has a lip 126 at the upper end thereof. The lip contacts the marginal edge portion of the opening 114 adjacent to the opening edge 124. Upon full downward pivoting of the inner casing 22, the lip serves to limit movement of the inner casing 22 as well as to position the inner casing in the proper location for illuminating the cargo box. A pair of small curved projections 128, 130 are provided on the cover 116 immediately beneath the lip 126. As will be noted in FIG. 7, the projections are spaced a distance form the lip 126 approximately equal to the thickness of the edge 124. The edge 124 frictionally passes by the projections 128, 130 when it is swung into the position shown in FIG. 7. While the inner casing 22 may be manually swung from the position illustrated in FIG. 7 back to that shown in FIG. 6, the frictional engagement of the projections 128, 130 with the edge 124 is sufficient to maintain the inner casing 22 in the position shown in FIG. 7. A small foam rubber block 132 is secured interiorly of the outer casing 20. The block 132 engages the inner casing 22 when the inner casing is swung into the outer casing as shown in FIG. 6. There is some compression of the block 132 when this occurs. The block 132 serves to stabilize the unit in its closed position and prevent rattling.

Wire retaining means are provided both on the cover 116 and upper portion 28 of the outer casing 20 to hold the various wires in place. As will be noted in FIGS. 2, 6 and 7, pairs of wire clips 134, 136 and 138, 140 are provided on the cover 116 to maintain the electrical wire leads 108, 110 in position adjacent the cover. Posts 142, 144 are provided to complete the wire retainer structure. Similar clips 143, 145 and post 146 are provided on the upper portion 28 of the outer casing 20 for the same purpose as will be noted in FIG. 4.

We claim:

1. A combination dome/cargo lamp for a pickup truck including a cargo box and a cab having a rear window permitting viewing of the cargo box, the dome/cargo lamp comprising an outer casing having an upper portion securable to the ceiling of the cab adjacent to the rear window, the outer casing having a lower portion, an inner casing, pivot means connecting the inner casing to the lower portion of the outer casing, an electric bulb in the inner casing, a lens on the inner casing covering the bulb to direct light outwardly of the inner casing, the inner casing being pivotable by hand into the outer casing where the lens will direct light into the cab thereby functioning as a dome lamp and pivotable by hand downwardly away from the outer casing to a position where the lens will direct light through the rear window into the cargo box thereby functioning as a cargo lamp, the outer casing having an opening therethrough adjacent to the pivot means, a cover extending from the inner casing through the opening, electrical wire means extending from the upper portion of the outer casing through the opening and between the inner casing and the cover into operative connection with the bulb, the cover traveling through the opening during pivoting of the inner casing and at all times isolating the electrical wire means from an operative hand.

2. The combination dome/cargo lamp as set forth in claim 1, further characterized in the provision of side wall means at each edge of the cover extending towards the inner casing to further isolate the electrical wire means from an operative hand.

3. The combination dome/cargo lamp as set forth in claim 1, further characterized in that the opening includes a marginal edge portion located closely adjacent to the cover, the cover including a lip at the upper end thereof, the lip engaging the marginal edge portion upon downward pivoting of the cover to limit the extent of downward pivoting of the inner casing and properly position the lens for directing light through the rear window.

4. A combination dome/cargo lamp as defined in claim 3, further characterized in the provision of frictional catch means on the cover to engage the marginal edge portion of the opening when the lip contacts the marginal edge portion to thereby frictionally retain the inner casing in the downwardly pivoted position.

5. The combination dome/cargo lamp as set forth in claim 3, further characterized in that the cover has an arcuate shape and substantially maintains contact with said marginal edge portion upon pivoting of the cover.

6. The combination dome/cargo lamp as defined in claim 1, further characterized in the provision of wire retainer structure on the cover maintaining the wire means in position adjacent the cover.

7. The combination dome/cargo lamp as defined in claim 1, further characterized in that said inner casing includes that opening means adjacent to the bulb to dissipate heat generated by the bulb when in use.

8. The combination dome/cargo lamp as defined in claim 1, further characterized in that the inner casing includes a tab, the outer casing having a recess to receive the tab when the inner casing is pivoted thereinto to thereby retain the inner casing in position, the pivot means including a pin structure movably journaled in one of the outer and inner casings, and spring means urging the pin structure to a position wherein the tab is securely captured in the recess after it is received therein to securely retain the inner casing in place, the inner casing being movable against the action of the spring means to release the tab from the recess and permit pivoting of the inner casing downwardly away from the outer casing to a position where the lens will direct light through the rear window into the cargo box.

9. The combination dome/cargo lamp as defined in claim 8, further characterized in that the spring means is located in the inner casing.

* * * * *